(12) United States Patent
Takahashi

(10) Patent No.: US 8,163,248 B2
(45) Date of Patent: Apr. 24, 2012

(54) METHOD FOR MIXING LIQUIDS AND LIQUID MIXING APPARATUS

(75) Inventor: Kazunori Takahashi, Ashigara-Kami-Gun (JP)

(73) Assignee: FUJIFILM Corporation, Tokyo (JP)

( * ) Notice: Subject to any disclaimer, the term of this patent is extended or adjusted under 35 U.S.C. 154(b) by 468 days.

(21) Appl. No.: 12/406,620

(22) Filed: Mar. 18, 2009

(65) Prior Publication Data

US 2009/0238736 A1  Sep. 24, 2009

(30) Foreign Application Priority Data

Mar. 19, 2008  (JP) .................................. 2008-072180

(51) Int. Cl.
*B01F 3/08* (2006.01)
*B01F 7/00* (2006.01)

(52) U.S. Cl. .................. 422/155; 366/169.1; 366/178.1; 366/315; 422/209; 422/259

(58) Field of Classification Search ............... 366/165.3, 366/169.1, 178.1, 315; 422/154, 155, 209, 422/258, 259
See application file for complete search history.

(56) References Cited

U.S. PATENT DOCUMENTS

| | | | | |
|---|---|---|---|---|
| 2,016,061 A | * | 10/1935 | Thiberge | 366/177.1 |
| 3,347,620 A | * | 10/1967 | Yamashita | 423/608 |
| 3,503,712 A | * | 3/1970 | Sussman | 422/601 |
| 3,801,326 A | * | 4/1974 | Claes | 430/642 |
| 5,026,167 A | * | 6/1991 | Berliner, III | 366/173.1 |
| 5,071,257 A | * | 12/1991 | Hasenpath et al. | 366/181.8 |
| 5,690,428 A | * | 11/1997 | Bryan et al. | 366/172.1 |
| 7,125,527 B2 | * | 10/2006 | Holl | 422/209 |
| 2005/0058014 A1 | | 3/2005 | Komori et al. | |

FOREIGN PATENT DOCUMENTS

| | | |
|---|---|---|
| EP | 0 499 363 A1 | 8/1992 |
| EP | 1 510 250 A2 | 3/2005 |
| GB | 250722 | 4/1926 |
| GB | 1080863 | 8/1967 |
| JP | 2005-77219 A | 3/2005 |
| WO | 96/00189 A1 | 1/1996 |
| WO | 2006/101240 A1 | 9/2006 |

OTHER PUBLICATIONS

EP Communication, dated Oct. 19, 2009, issued in corresponding EP Application No. 09003891.0, 10 pages.
Oxley et al., "Evaluation of Spinning Disk Reactor Technology for the Manufacture of Pharmaceuticals," Industrial & Engineering Chemistry Research, vol. 39, No. 7, May 27, 2000, pp. 2175-2182.

* cited by examiner

*Primary Examiner* — Robert B Davis
(74) *Attorney, Agent, or Firm* — Sughrue Mion, PLLC

(57) ABSTRACT

According to the method of an aspect of the present invention, by forming the laminated body of the liquids by laminating a plurality of liquids after discharging the plurality of liquids from a central portion of the rotational stage onto the rotational stage and rotating the rotational stage after the formation, the centrifugal force by the rotation enables the laminated body to form a thin layer. Accordingly, because the diffusion between the layers can be executed rapidly in the latter mixing process, a mixing of liquids is allowed to advance immediately.

10 Claims, 3 Drawing Sheets

METHOD FOR MIXING LIQUIDS AND LIQUID MIXING APPARATUS

BACKGROUND OF THE INVENTION

1. Field of the Invention

The present invention relates to a method for mixing liquids, and a liquid mixing apparatus. More particularly, it relates to a method and an apparatus for allowing liquids to mix each other by their diffusion after forming a laminated structure of the liquids in the states of thin layers.

2. Description of the Relate Art

As one apparatus for mixing plural kinds of fluid effectively, for example, Japanese Patent Application Publication No. 2005-77219 proposes a microdevice which joins the plural kinds of fluid to flow together into an inlet of a microflow passage being a flow passage of a micron order, and enables to homogeneously mix them each other in an instant. As shown in FIG. 4, the microdevice is formed as a Y-shaped flow passage composed of a micro flow passage 114 which allows a plurality of fluids F1 and F2 to flow as a wafer-shaped laminar flow and causes them to mix each other or to react each other accompanied by mixing, and of two fluid supply passages 118A and 118B for feeding the fluids F1 and F2. Then, the fluids F1 and F2 fed into the fluid supply passages 118A and 118B are made to join each other at a joining portion 120 each other as to flow through one micro flow passage 114. While the fluids F1 and F2 are caused to flow as a wafer-shaped laminar flow, they are allowed to mix and react each other, the resultant mixed and reacted liquid FM is discarded from a trailing end of the micro flow passage 114.

When the flow passage is micronized as described in Japanese Patent Application Publication No. 2005-77219, a mixing effect by molecular diffusion becomes great. A diffusion time by the molecular diffusion is affected by square of a distance as shown in the equation: $T=L^2/D$ (D: a diffusion coefficient; L: a typical distance over which molecules diffuse and reach during a time T). Accordingly, it becomes important that how thin the thickness of the laminated body made by laminating plural kinds of liquid which diffusively mix each other is reduced. Therefore, it is necessary that the flow passage of the microdevice is formed into the flow passage having a minute width.

SUMMARY OF THE INVENTION

However, when the width of the flow passage is narrowed, although the diffusion time is reduced, the following problems occurred on the other hand: namely, the fabrication process is difficult, the pressure loss of the flow passage becomes too great, and when the fine particles are generated by diffusive mixing, the fine particles clog the flow passage.

The present invention has been made in view of the above situation and the object of the present invention is to provide a method and a apparatus for allowing liquids to mix each other rapidly after forming a laminated structure of the liquids in the states of thin layers.

To achieve the above object, a first aspect of the present invention provides a method for mixing liquids comprising a laminated body formation process for forming a laminated body by laminating a plurality of liquids after discharging the plurality of liquids from a central portion of a rotational stage onto the rotational stage, a layer thinning process for allowing the laminated body to form a thin layer by spreading the laminated body from the central portion to an outer peripheral portion side with a centrifugal force induced by a rotation of the rotational stage, and a mixing process for allowing the laminated body which was allowed to form a thin layer to mix each other by diffusing it between the layers.

According to the first aspect, by forming the laminated body of the liquids by laminating a plurality of liquids after discharging the plurality of liquid from a central portion of the rotational stage onto the rotational stage and rotating the rotational stage after the formation, the centrifugal force by the rotation enables the laminated body to form a thin layer. Accordingly, because the diffusion between the layers can be executed rapidly in the latter mixing process, a mixing of liquids is allowed to advance immediately.

A second aspect of the present invention is characterized in that in the first aspect, the layer thinning process is controlled by controlling a rotation rate of the rotational stage.

According to the second aspect, a control of the rotation rate of the rotational stage enables to adjust so that the thin layer can be formed and that the mixing is achieved on the rotational stage.

To achieve the above object, a third aspect of the present invention provides a liquid mixing apparatus comprising a rotational stage and a flow passage through which at least two kinds of liquid pass in a vertical direction upwardly, wherein the flow passage is disposed perpendicularly with respect the rotational stage, an outlet of the flow passage is disposed at the center of the rotational stage, and the flow passage has a concentric multilayered cylindrical structure.

According to the third aspect of the present invention, the liquids are flown out from the flow passage with the concentric multilayered cylindrical structure onto the rotational stage. Then, induced by the centrifugal force occurring due to the rotation of the rotational stage, the liquid moves toward the circumferential direction and is spread, and as a result, a thin laminated body of the liquids is formed on the rotational stage. Afterwards, the formed laminated body is allowed to mix each other induced by diffusion. Because the thin laminated body of the liquids is formed on the rotational stage due to the rotation, the liquids can be mixed each other rapidly induced by diffusion.

A fourth aspect of the present invention is characterized in that in the third aspect, the flow passage has a laminar multilayered cylindrical structure of two layers or not less than three layers.

According to the fourth aspect, because the flow passage has a laminar multilayered cylindrical structure of two layers or not less than three layers, the laminated body of the liquids can be easily formed on the rotational stage. Further, because the multilayered cylindrical structure of not less than three layers enables to laminate another liquid between the liquid to be reacted each other, a reaction immediately after discharging out from the flow passage can be suppressed and a precipitation of crystals in the vicinity of the discarding exit of the flow passage is also suppressed.

A fifth aspect of the present invention is characterized in that in the third or fourth aspect, the inner diameter of the outermost layer in the flow passage is not smaller than 3 mm, and the inner diameter of the innermost layer in the flow passage is not smaller than 1 mm.

According to the fifth aspect, the thickness of each layer in the laminated body formed on the rotational stage can be decreased thinly (down to not larger than 500 μm) by speculating both the inner diameter of the outermost layer and the inner diameter of the innermost layer in the flow passage within the above range, mixing the liquids each other can be proceeded rapidly.

A sixth aspect of the present invention is characterized in that in any one of the third to fifth aspects, the number of revolutions of the rotational stage is not less than 500 rpm but not more than 6,000 rpm.

According to the sixth aspect, a control of the rotation rate of the rotational stage within the above range enables to adjust so that the mixing is achieved on the rotational stage, while the liquids are allowed to form a thin layer by the centrifugal force.

A seventh aspect of the present invention is characterized in that in any one of the third to sixth aspects, a contact angle between a liquid passing through the external layer of the flow passage and the rotational stage is not wider than 90 degrees.

According to the seventh aspect, the contact angle between the liquid passing through the external layer of the flow passage, i.e., the liquid which contacts with the rotational stage at the time of flowing out onto the rotational stage and the rotational stage within the above range will preferably allow the liquid to move rapidly toward the circumferential direction on the rotational stage.

An eighth aspect of the present invention is characterized in that in any one of the third to seventh aspects, fine particles are formed by allowing the liquids to mix and react each other.

In the liquid mixing apparatus of the present invention, because a place where the liquids are made to join each other is on the rotational stage, fine particles formed by mixing never clog the flow passage. Accordingly, the liquid mixing apparatus can be used effectively.

According to the present invention, after discharging the plurality of liquids from a central portion of a rotational stage onto the rotational stage, allowing the liquids to form a thin layer by spreading the reaction liquids from the central portion to an outer peripheral portion side with a centrifugal force induced by a rotation of the rotational stage. At the same time, each reaction liquid is allowed to form a thin layer and further, to mix each other by diffusing it in an instant. Further, without making the liquids each other among the flow passage as was proceeded in the conventional apparatus, the mixture liquid neither contacts with a wall surface of the flow passage nor stay in the flow passage. Also, even when the fine particles generate, they never clog the flow passage and the liquids are made to mix each other efficiently.

DETAILED DESCRIPTION OF THE PREFERRED EMBODIMENTS

Preferred embodiments of a liquid mixing apparatus according to the present invention will now be described in detail with reference to the accompanying drawings.

Figure 1:
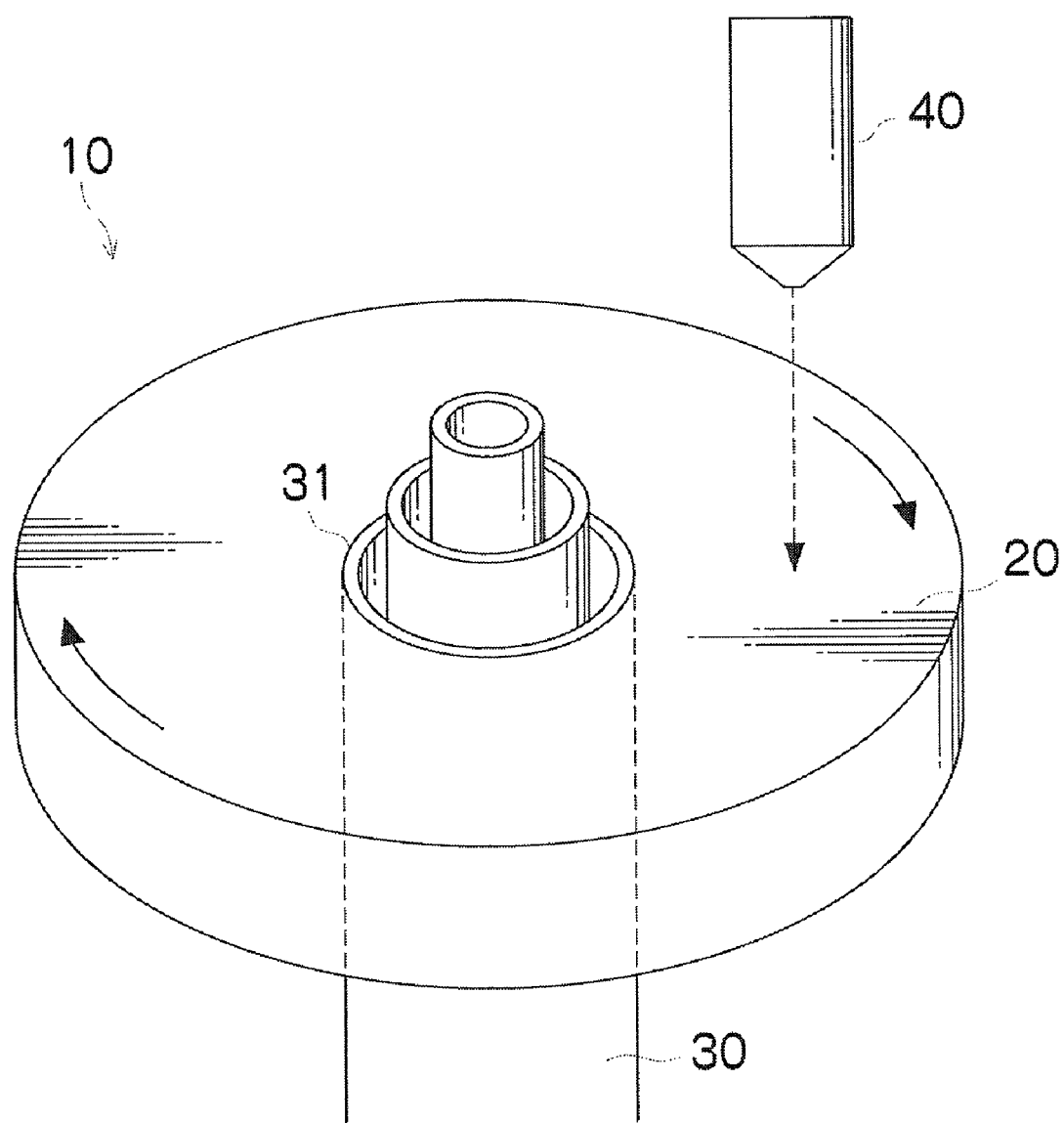
FIG. 1 is a perspective view for illustrating the general construction of a liquid mixing apparatus of the present invention.
Figure 2:
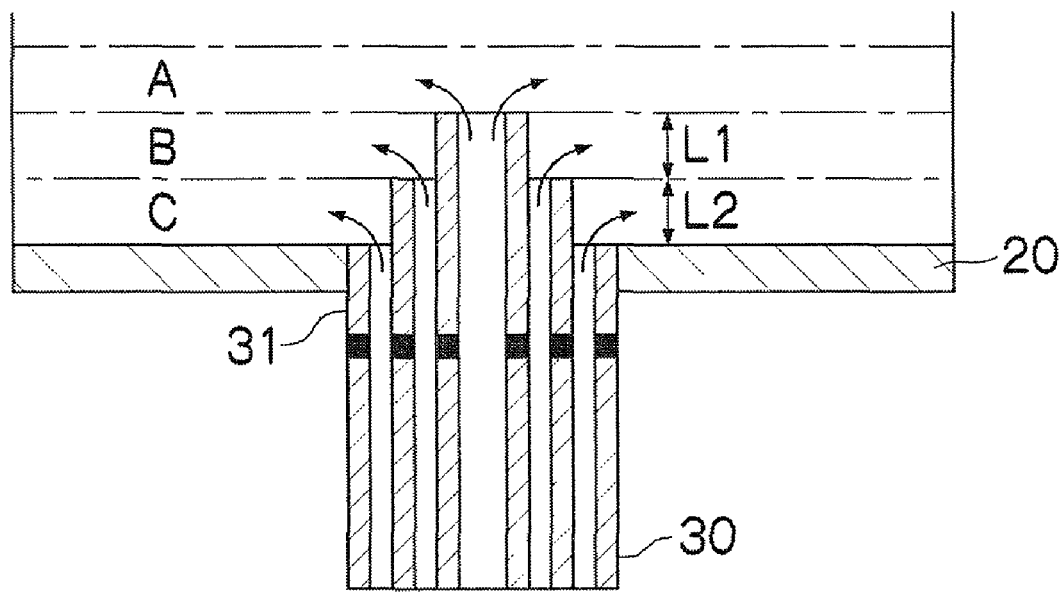
FIG. 2 is a sectional view of the liquid mixing apparatus in an occasion of discharging liquids.

FIG. 1 is a perspective view for illustrating the general construction of a liquid mixing apparatus of the present invention, and FIG. 2 is a sectional view of the liquid mixing apparatus through which the liquid flows.

A liquid mixing apparatus 10 of the present invention comprises a rotational stage 20 and a flow passage 30 through which liquids are allowed to flow. The rotational stage 20 and the flow passage 30 are disposed vertically with respect to the rotational stage 20, and it is preferable that they are disposed in such a way that a reaction liquid which passes through the flow passage 30 and flows out from a nozzle 31 is spread in all the directions over the rotational stage 20. Further, in order to spread the reaction liquid uniformly, the flow passage 30 is disposed at the center of the rotational stage 20.

The flow passage 30 is formed into the multilayered cylindrical structure with a concentric circle in order for making each reaction liquid to pass through the flow passage individually. In correspondence with the flow passage 30, the nozzle 31 is also formed equally into a concentrically circular shape. Each reaction liquid passed through the flow passage 30 and nozzle 31 are allowed to join each other and flow together after being discharged from the nozzle 31.

In FIG. 1, the flow passage 30 is made of three-layered cylindrical structure; however the number of layers is not limited but can be increased depending on the number of liquids to be mixed each other. Additionally, the three-layered cylindrical structure makes the same liquid to pass through the outermost layer and the innermost layer, while making another liquid through the intermediate layer. Accordingly, because the liquid of the intermediate layer laminated on the rotational stage 20 can be allowed to mix by diffusions from the upper layer and the lower layer, it is possible to carry out mixing rapidly.

In addition, regarding with the inner diameter of the of flow passage 30, it is not limited in particular so long as a layer with a thickness of not larger than 500 μm is formed of each reaction liquid when it is flown out over the rotational stage 20. However, it is preferable that the inner diameter of the outermost layer is not smaller than 3 mm, and that the inner diameter of the innermost layer is not smaller than 1 mm.

Further, at a leading end of the nozzle 31, there are differences of protrusion provided with going from the external layer to the internal layer as shown in FIG. 2. Accordingly, it is possible to easily laminate the liquid discharged from the internal layer over the liquid discharged from the external layer. In FIG. 2, a liquid C discharged from the outermost layer of the flow passage 30 becomes as a lower layer of the laminated body on the rotational stage 20, and similarly, a liquid B becomes as the intermediate layer, and a liquid A discharged from the center of the flow passage 30 becomes as an upper layer of the laminated body.

Both a difference L1 of protrusion between the internal layer and the external layer and a difference L2 of protrusion between the rotational stage 20 and the internal layer are preferably not smaller than 50 μm and not larger than 300 μm. When the difference of protrusion is narrower than the above range, it becomes difficult to form the laminated body of the liquid. On the contrary, when it is wider than the above range, each layer becomes thick in the thickness so that allowing a thin layer to be formed becomes difficult, and there may be a case of requiring a long time for mixing.

Figure 3:
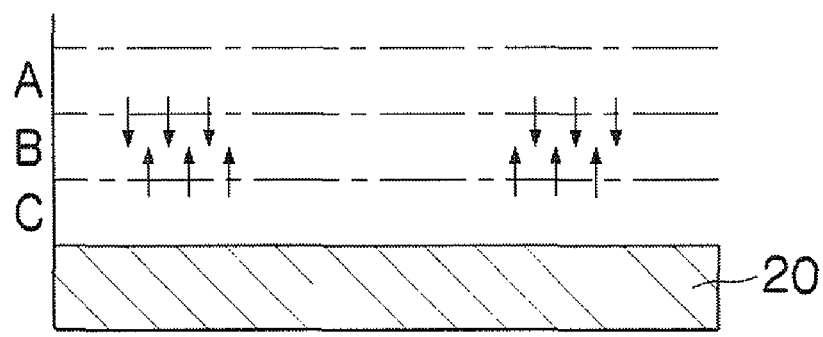
FIG. 3 is a drawing of a laminated body of the liquid in the vicinity of an outer peripheral portion of a rotational stage.
Figure 4:
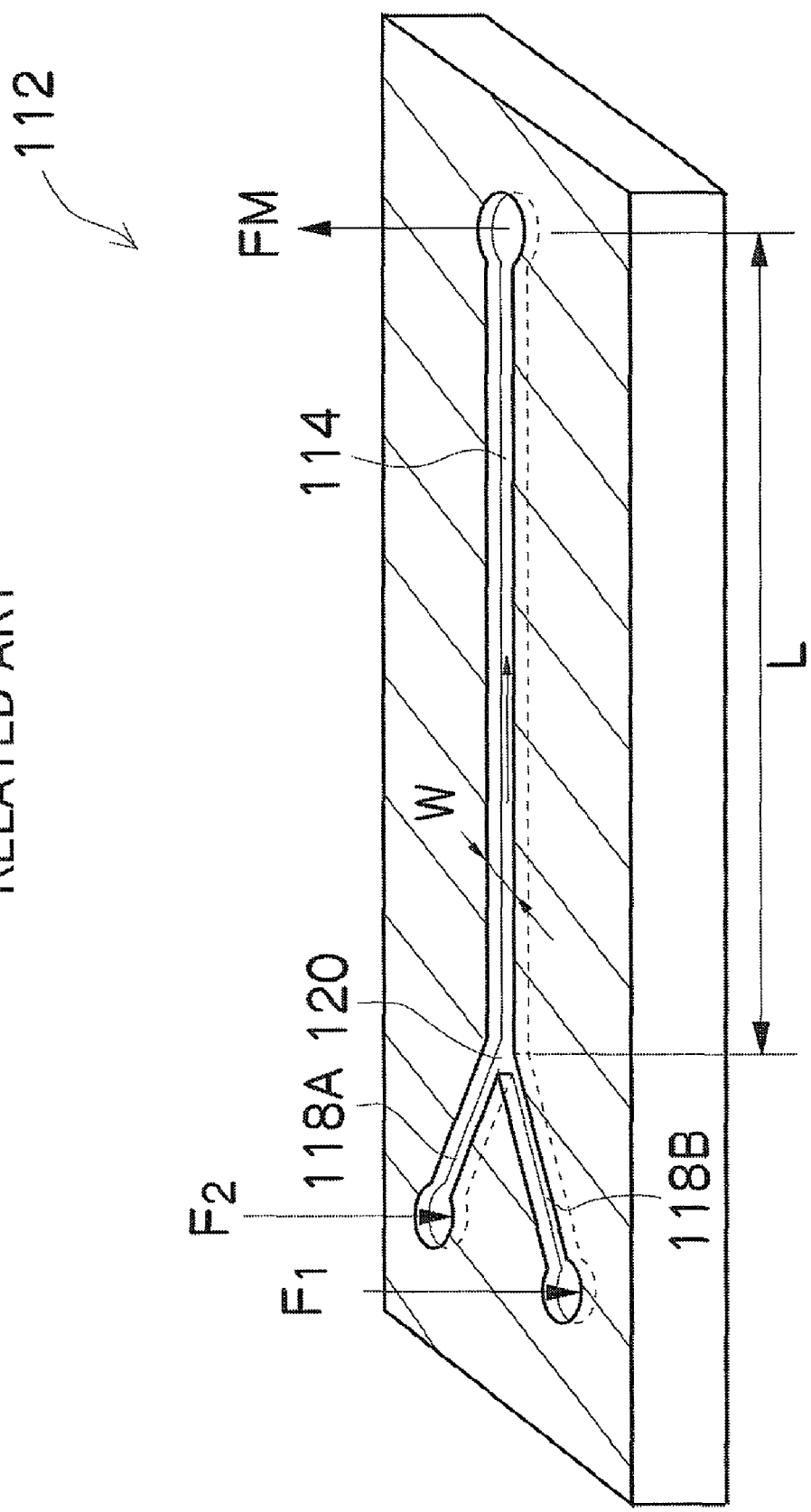
FIG. 4 is an explanatory view for illustrating about a conventional microdevice.

Each liquid discharged from the nozzle 31 moves to outer peripheral portion side of the rotational stage 20 induced by a centrifugal force due to the rotation of the rotational stage 20, as shown in FIG. 2. FIG. 3 is a drawing of a laminated body in the vicinity of an outer peripheral part of the rotational stage 20. The laminated body is forcibly made into the thin layer by the centrifugal force. Regarding with the liquid made into the thin layer, the liquid B of the intermediate layer starts to be diffusionaly mixed between the liquid A of the upper layer and the liquid C of the lower layer on the rotational stage 20, as shown in FIG. 3. Because the liquid is made into the thin layer by the centrifugal force, the diffusional mixing can be completed in an instant.

In this situation, the number of revolutions of the rotational stage 20 is preferably not less than 500 rpm and not more than 6,000 rpm. The number of revolutions within the above range enables to allow the liquids flown out onto the rotational stage 20 forming a thin layer and at the same time, enables to complete the mixing on the rotational stage 20. Similarly, the viscosity of the liquid is preferably not less than 1 mPa·s and not more than 10 mPa·s. When the viscosity of the liquid becomes high, allowing the liquid to form a thin layer by the centrifugal force is difficult to cause, and the diffusional mixing takes long time. Accordingly, it is preferable that the viscosity is adjusted within the above range.

Regarding with the liquid which is used to the liquid mixing apparatus of the present invention, the liquid not only to be merely mixed but also to be changed in its solubility, to be proceeded precipitation and formation of fine particles can be used.

Additionally, the contact angle between the liquid passing through the external layer of the flow passage 30, i.e., the liquid which contacts with the rotational stage 20 at the time of flowing out onto the stage and the rotational stage 20 is preferably not more than 90 degrees. When the contact angle is wide and the wettability with the rotational stage is poor, allowing the liquid to form a thin layer and the movement of the reaction liquid is not efficiently advanced and as a result, an insufficient mixing may happen.

In addition, when a monodispersing nanoparticle precipitation method by buildup, for example, pigment particles deposition is carried out, it is preferable that a pigments solution is flown as in a manner without touching with a part such as a solid wall (in the present invention, the rotational stage 20) as possible. In other words, when the laminated body is formed of a plurality of liquids on the rotational stage 20, it is preferable that the pigment solution is flown so that it becomes the uppermost layer of the laminated body. By making the pigment solution into the uppermost layer, one side of the layer becomes contact with air (gas phase) and resultantly react only with a poor solvent in the lower layer, promoting to react more homogeneously. On the assumption that the pigment solution is flown being contact with rotational stage 20 (the lowermost layer of the laminated body), it is possible that particle deposition may be promoted by being contact with the rotational stage, which is unfavorable.

A mixture liquid formed in this way is discharged from the outer periphery of the rotational stage 20.

In addition, not only allowing the mixture liquid discharged from the flow passage 30 but also dripping another liquid into the mixture liquid mixed on the rotational stage 20 by dripping equipment 40 can allow the mixture liquid to mix or react further. Accordingly, after allowing the liquids discharged from the nozzle 30 to mix each other, a step mixing such as further allowing the liquid from the dripping equipment 40 or so to mix each other is also possible. Regarding with the liquid dripping from the dripping equipment 40, a liquid having the same physical property as the liquid passing through the flow passage 30 can be used.

Next, a description will be made about materials used for the method and apparatus for allowing liquids to mix each other in the present invention.

When fine particles are formed by mixing, allowing to contact a material solution prepared by dissolving a particle formation material into a good solvent and a poor solvent solution which is a poor solvent with respect to the particle formation material and which is compatible with the good solvent enables to precipitate the fine particles by changing the solubility of the particle formation material in the good solvent. Examples of the materials for forming the particles include titanium dioxide, calcium carbonate, copper oxide, aluminum oxide, iron oxide, chromium oxide, bismuth vanadium oxide, rutile type blending phase pigments, silver halide, silica and carbon black, without being limited to them.

The organic pigment that can be used is not limited in the hue thereof, and it may be a magenta pigment, a yellow pigment or a cyan pigment. Specifically, the organic pigment may be a magenta pigment, a yellow pigment or a cyan pigment of a perylene, perinone, quinacridon, quinacridonquinone, anthraquinone, anthanthron, benzimidazolone, condensed disazo, disazo, azo, indanthrone, phthalocyanine, triaryl carbonium, dioxanzine, aminoanthraquinone, diketopyrrolopyrrole, thioindigo, isoindoline, isoindolinone, pyranthrone or isoviolanthrone series pigment, or a mixture thereof. Further detailed examples include perylene series pigments such as C. I. Pigment Red 190 (C. I. No. 71140), C. I. Pigment Red 224 (C. I. No. 71127), C. I. Pigment Violet 29 (C. I. No. 71129); perynone series pigments such as C. I. Pigment Orange 43 (C. I. No. 71105) or C. I. Pigment Red 194 (C. I. No. 71100); quinacridon series pigments such as C. I. Pigment Violet 19 (C. I. No. 73900), C. I. Pigment Violet 42, C. I. Pigment Red 122 (C. I. No. 73915), C. I. Pigment Red 192, C. I. Pigment Red 202 (C. I. No. 73907), C. I. Pigment Red 207 (C. I. No. 73900, 73906) or C. I. Pigment Red 209 (C. I. No. 73905); quinacrydonquinone series pigments such as C. I. Pigment Red 206 (C. I. No. 73900/73920), C. I. Pigment Orange 48 (C. I. No. 73900/73920) or C. I. Pigment Orange 49 (C. I. No. 73900/73920); anthraquinone series pigments such as C. I. Pigment Yellow 147 (C. I. No. 60645); anthanthron series pigments such as C. I. Pigment Red 168 (C. I. No. 59300); benzimidazolone series pigments such as C. I. Pigment Brown 25 (C. I. No. 12510), C. I. Pigment Violet 32 (C. I. No. 12517), C. I. Pigment Yellow 180 (C. I. No. 21290), C. I. Pigment Yellow 181 (C. I. No. 11777), C. I. Pigment Orange 62 (C. I. No. 11775) or C. I. Pigment Red 185 (C. I. No. 12516); condensed disazo series pigments such as C. I. Pigment Yellow 93 (C. I. No. 20710), C. I. Pigment Yellow 94 (C. I. No. 20038), C. I. Pigment Yellow 95 (C. I. No. 20034), C. I. Pigment Yellow 128 (C. I. No. 20037), C. I. Pigment Yellow 166 (C. I. No. 20035), C. I. Pigment Orange 34 (C. I. No. 21115), C. I. Pigment Orange 13 (C. I. No. 21110), C. I. Pigment Orange 31 (C. I. No. 20050), C. I. Pigment Red 144 (C. I. No. 20735), C. I. Pigment Red 166 (C. I. No. 20730), C. I. Pigment Red 220 (C. I. No. 20055), C. I. Pigment Red 221 (C. I. No. 20065), C. I. Pigment Red 242 (C. I. No. 20067), C. I. Pigment Red 248, C. I. Pigment Red 262 or C. I. Pigment Brown 23 (C. I. No. 20060); disazo series pigments such as C. I. Pigment Yellow 13 (C. I. No. 21100), C. I. Pigment Yellow 83 (C. I. No. 21108) or C. I. Pigment Yellow 188 (C. I. No. 21094); azo pigments such as C. I. Pigment Red 187 (C. I. No. 12486), C. I. Pigment Red 170 (C. I. No. 12475), C. I. Pigment Yellow 74 (C. I. No. 11714), C. I. Pigment Red 48 (C. I. No. 15865), C. I. Pigment Red 53 (C. I. No. 15585), C. I. Pigment Orange 64 (C. I. No. 12760) or C. I. Pigment Red 247 (C. I. No. 15915); indanthrene series pigments such as C. I. Pigment Blue 60 (C. I. No. 69800), phthalocyanine series pigments such as C. I. Pigment Green 7 (C. I. No. 74260), C. I. Pigment Green 36 (C. I. No. 74265), Pigment Green 37 (C. I. No. 74255), Pigment Blue 16 (C. I. No. 74100), C. I. Pigment Blue 75 (C. I. No. 74160:2) or 15 (C. I. No. 74160); triaryl carbonium series pigments such as C. I. Pigment Blue 56 (C. I. No. 42800) or C. I. Pigment Brue 61 (C. I. No. 42765:1); dioxanzine gin series pigments such as C. I. Pigment Violet 23 (C. I. No. 51319) or C. I. Pigment Violet 37 (C. I. No. 51345); aminoanthraquinone series pigments such as C. I. Pigment Red 177 (C. I. No. 65300); diketopyrrolopyrrole series pigments such as C. I. Pigment Red 254 (C. I. No. 56110), C. I. Pigment Red 255 (C. I. No. 561050), C. I. Pigment Red 264, C. I. Pigment Red 272 (C. I. No. 561150), C. I. Pigment Orange 71 or C. I. Pigment Orange 73; thioindigo series pigments such as C. I. Pigment Red 88 (C. I. No. 73312); isoindoline series pigments such as C. I. Pigment Yellow 139 (C. I. No. 56298), C. I. Pigment Orange 66 (C. I. No. 48210); isoindolinone series pigments such as C. I. Pigment Yellow 109 (C. I. No. 56284) or C. I. Pigment Orange 61 (C. I. No. 11295); pyranthrone series pigments such as C. I. Pigment Orange 40 (C. I. No. 59700) or C. I. Pigment Red 216 (C. I. No. 59710); or isoviolanthrone series pigments such as C. I. Pigment Violet 31 (C. I. No. 60010).

Preferred pigments are quinacridon series, diketopyrrolopyrrole series, disazo condensed series, azo series, phthalocyanine series or dioxadine series pigments.

Next, a description will be made about the good solvent. Any solvent capable of dissolving organic pigments to be used and compatible or homogeneously mixable with the poor solvent can be employed as the good solvent dissolving the organic pigments without being limited in particular. The solubility of the organic pigments with respect to the good solvent is preferably not less than 0.2% by mass, and more preferably not less than 0.5% by mass. Although the solubility of the organic pigments has no upper limit in particular, considering about organic materials used usually, it is practically not more than 50% by mass. Additionally, the solubility of the organic pigments may be the solubility under the presence of acid or alkali.

Regarding with the compatibility or homogeneously mixing property between the poor solvent and the good solvent, a dissolution amount of the good solvent with respect to the poor solvent is preferably not less than 30% by mass, more preferably not less than 50% by mass, and the most preferably not less than 90% by mass. In other words, although the dissolution amount of the good solvent with respect to the poor solvent has no upper limit in particular, it is practical to be within the range of mixing each other in an arbitrary ratio.

Examples of the good solvent include an aqueous solvent (for example, water or hydrochloric acid, sodium hydroxide aqueous solution), an alcohol compound solvent, an amide compound solvent, a ketone compound solvent, an ether compound solvent, an aromatic compound solvent, a carbon bisulfide solvent, an aliphatic compound solvent, a nitrile compound solvent, a sulfoxide compound solvent, a halogen compound solvent, an ester compound solvent, an ionic liquid, and a mixed solvent of these. Preferable examples include the aqueous solvent, the alcohol compound solvent, the ketone compound solvent, the ether compound solvent, the sulfoxide compound solvent, the ester compound solvent, the amide compound solvent or a mixture of these. Also, preferable examples include the aqueous solvent, the alcohol compound solvent, the ester compound solvent, the sulfoxide compound solvent or the amide compound solvent. Further preferable examples include the aqueous solvent, the sulfoxide compound solvent or the amide compound solvent; and particularly preferable examples include the sulfoxide compound solvent or the amide compound solvent.

Examples of the sulfoxide compound solvent include dimethylsulfoxide, diethyl sulfoxide, hexamethylene sulfoxide, sulfolane and so on. Examples of the amide compound solvent include N,N-dimethylformamide, 1-carbinyl-2-pyrrolidone, 2-pyrrolidinone, 1,3-dimethyl-2-imidazolidinone, 2-pyrrolidinone, ε-caprolactam, formamide, N-methylformamide, acetamide, N-methylacetamide, N,N-dimethylacetamide, N-methylpropane amide, hexamethylphosphorictriamide and so on.

In the present invention, two or more kinds of the organic pigments or a solid solution of the organic pigment, or a combination of the organic pigment with an inorganic pigment may be used. It is necessary that the organic pigment is homogeneously dissolved in the good solvent; however, it is preferable to be dissolved in an alkaline or acidic aqueous solution. In general, in the case of the pigment having in the molecule thereof a group dissociative under alkaline, the alkaline medium is used, and in the case of the pigment having no group dissociative under alkaline and having in the molecule thereof many nitrogen atoms, to which protons easily adhere, the acidic medium is used. For example, quinacridon-, diketopyrrolopyrrole-, and condensed disazo series pigments are dissolved in the alkaline medium, and a phthalocyanine series pigment is dissolved in the acidic medium.

Examples of a base that can be used in the case that the pigment is dissolved in alkaline medium include inorganic bases such as sodium hydroxide, calcium hydroxide or barium hydroxide; or organic bases such as trialkylamine, diazabicycloundecene (DBU), and metalalkoxide. The amount of the base to be used is not particularly limited, as long as the base in the amount can make the pigment be dissolved homogeneously. In the case of the inorganic base, the amount thereof is preferably from 1.0 to 30 mole equivalents, and more preferably from 2.0 to 25 mole equivalents, and further preferably from 3 to 20 mole equivalents each with respect to the pigment respectively. In the case of the organic base, the amount thereof is preferably from 1.0 to 100 mole equivalents, more preferably from 5.0 to 100 mole equivalents, and further preferably from 20 to 100 mole equivalents each with respect to the pigment respectively.

Examples of an acid to be used in the case that the pigment is dissolved in the acidic medium include inorganic acids such as sulfuric acid, hydrochloric acid or phosphoric acid; or organic acid such as acetic acid, trifluoroacetic acid, oxalic acid, methanesulfonic acid or trifluoromethane sulfonic acid. Among those, sulfuric acid is particularly preferable. The amount of the acid to be used is not particularly limited, as long as the amount can make the pigment be dissolved homogeneously. In many cases, the acid is used in a larger or more excessive amount than the base. Regardless the kind of the acid being an inorganic acid or an organic acid, the amount the acid to be used is preferably from 3 to 500 mole equivalents, more preferably from 10 to 500 mole equivalents, and further preferably from 30 to 200 mole equivalents each with respect to the pigment respectively.

When a good solvent prepared by mixing alkali or acid with organic solvent each other is used, it is preferable to add a solvent exhibiting a high solubility with respect to alkali or acid into the organic solvent in order to dissolve alkali or acid into the good solvent completely. Examples of the solvent include water, lower alcohol or the like. Specific examples of the lower alcohol to be used include water, methanol, ethanol, n-propanol, isopropanol, butyl alcohol and so on. The amount of the solvent is preferably not more than 50% by mass with respect to the good solvent, more preferably not more than 30% by mass with respect to the good solvent.

Next, a description will be made about the bad solvent. Any solvent being compatible or homogeneously mixable with the good solvent can be employed without being limited in particular as the bad solvent incapable of easily dissolving the organic pigments. The solubility of the organic pigments with respect to the bad solvent is preferably not more than 0.02% by mass, and more preferably not more than 0.01% by mass.

The solubility of the organic pigment with respect to the poor solvent has no lower limit in particular. The solubility may be the solubility when the organic pigment is dissolved in the presence of acid or alkali. In addition, a preferred range of the compatibility between the good solvent and the poor solvent or homogeneous mixing property between them is as the foregoing description.

Examples of the bad solvent include an aqueous solvent (for example, water or hydrochloric acid, sodium hydroxide aqueous solution), an alcohol compound solvent, a ketone compound solvent, an ether compound solvent, an aromatic compound solvent, a carbon bisulfide solvent, an aliphatic compound solvent, a nitrile compound solvent, a halogen compound solvent, an ester compound solvent, an ionic liquid, and a mixed solvent of these. Preferable examples include the aqueous solvent, the alcohol compound solvent, the ketone compound solvent, the ether compound solvent, the ester compound solvent, or the mixture of these.

Examples of the alcohol compound solvent include methanol, ethanol, isopropanol, n-propyl alcohol, 1-methoxy-2-propanol and so on. Examples of the ketone compound solvent include acetone, methyl ethyl ketone, methyl isobutyl ketone, cyclohexanone and so on. Examples of the ether compound solvent include dimethylether, diethyl ether, tetrahydrofuran and so on. Examples of the aromatic compound solvent include benzene, toluene and so on. Examples of the aliphatic compound solvent include hexane and so on. Examples of the nitrile compound solvent include acetonitrile and so on. Examples of the halogen compound solvent include dichloro-methane, trichloroethylene and so on. Examples of the ester compound solvent include ethyl acetate, ethyl lactate, 2-(1-methoxy)propyl acetate and so on. Examples of the ionic liquid include salt of 1-butyl-3-methylimidazolium and $PF_6$— and so on.

In the present invention, it is preferred to introduce a homogeneously dissolving an organic solvent or a material therefore into the flow passage. When a suspension is introduced into the flow passage, the size of the particles therein becomes large or pigment fine particles having a wide particle size distribution are generated. This results, as the case may be, to be apt to block the flow passage. The wording "homogeneously dissolving" means a solution in which turbidity (muddiness) is hardly observed when the solution is observed under visible light, in the present invention, a solution obtained by filtration through a microfilter having pores of not larger than 1 μm in diameter, or a solution which does not contain any substance remaining after the solution is filtered through a filter having pores of 1 μm in diameter, is defined as a homogeneously dissolved solution.

When the pigment fine particle is formed, it is preferable to add a dispersing agent into either of a pigment solution or a poor solvent solution, or into both of them. The dispersing agent rapidly absorbs onto the pigment fine particle precipitated, and prevents that the pigment fine particles aggregate each other again. As the dispersing agent, general use can be made of an anionic dispersing agent, a cationic dispersing agent, amphoteric dispersing agent, pigmentary and low molecular weight or polymer dispersing agent.

Examples of the anionic dispersing agent (anionic surfactant) include N-acyl-N-alkyltaurine salts, fatty acid salts, alkyl sulfate ester salts, alkyl benzene sulfonates, alkyl naphthalenesulfonates, dialkyl sulfo succinic acid salts, alkylphosphate ester salts, naphthalenesulfonic acid formalin condensates, polyoxyethylene alkyl sulfate ester salts and so on. Among those, N-acyl-N-alkyltaurine salts are preferable. Those disclosed in Japanese Patent Application Publication No. 3-273067 are preferable as N-acyl-N-alkyl taurine salts. Only a single anionic dispersing agent may be used, or two or more anionic dispersing agents may be used in combination.

Examples of the cationic dispersing agent (cationic surfactant) include quaternary ammonium salts, alkoxylated polyamines, aliphatic amine polyglycol ethers, aliphatic amines, diamines and polyamines derived from aliphatic amines and aliphatic alcohols, imidazolines derived from aliphatic acid and salts of these cationic substances. Only a single cationic dispersing agent may be used, or two or more cationic dispersing agents may be used in combination.

The amphoteric dispersing agent is a dispersing agent having, in the molecule thereof, an anionic group moiety which the anionic dispersing agent has in the molecule, and a cationic group moiety which the cationic dispersing agent has in the molecule.

Examples of the nonionic dispersing agents (nonionic surfactant) include polyoxyethylenealkylethers, polyoxyethylenealkylaryl ethers, polyoxyethylene fatty acid esters, sorbitan fatty acid esters, polyoxyethylenesorbitan fatty acid esters, polyoxyethylenealkylamines, glycerine fatty acid esters and so on. Among these, polyoxyethylenealkylaryl ethers are preferable. Only a single nonionic dispersing agent may be used, or two or more anionic dispersing agents may be used in combination.

The organic pigmentary dispersing agent is defined as a dispersing agent derived from an organic pigment as a parent material, and prepared by chemically modifying a structure of the parent material. Examples include sugar-containing organic pigmentary dispersing agents, piperidyl-containing organic pigmentary dispersing agents, naphthalene- or perylene-derivative organic pigmentary dispersing agents, organic pigmentary dispersing agents having a functional group linked through a methylene group to a parent-structure, organic pigmentary dispersing agents (parent-structure) chemically modified with a polymer, organic pigmentary dispersing agents having a sulfonic acid group, organic pigmentary dispersing agents having a sulfonamide group, organic pigmentary dispersing agents having an ether group, and organic pigmentary dispersing agents having a carboxylic acid group, carboxylic acid group or a carboxamide group.

Specific examples of the polymer dispersing agent include polyvinylpyrrolidone, polyvinyl alcohol, polyvinyl methylether, polyoxyethylene oxide, polyethylene glycol, polypropylene glycol, polyacrylamide, vinyl alcohol-vinyl acetate copolymer, polyvinyl alcohol-partly formalated product, polyvinyl alcohol-partly butyralated product, vinylpyrrolidone-vinyl acetate copolymer, polyoxyethylene/propylene oxide block copolymer, polyacrylate, polyvinyl sulfate, poly(4-vinylpyridine) salt, polyamide, polyallylamine salt, condensed naphthalenesulfonate, styrene-acrylate copolymer product, styrene-methacrylate copolymer product, acrylate-acrylate copolymer product, acrylate-methacrylate copolymer product, methacrylate-acrylate copolymer product, methacrylate-methacrylate copolymer product, styrene-itaconic acid salt copolymer product, itaconic acid ester-itaconic acid salt copolymer product, vinylnaphthalene-acrylate copolymer product, vinylnaphthalene-methacrylate copolymer product, vinylnaphthalene-itaconic acid salt copolymer product, cellulosic, carbohydrate derivative and so on. Besides, natural polymers such as alginate, gelatin, albumen, casein, Arabian rubber, Tongant rubber, lignosulfonate can be also usable. Among those, polyvinylpyrrolidone is preferable. Only a single polymer may be used, or two or more polymers may be used in combination. Further, examples of the polymer dispersing agent include an embodiment prepared by allowing an anionic dispersing agent to be contained into an aqueous medium and by allowing a nonionic dispersing agent and/or a polymer dispersing agent to be contained into a solution into which pigments are dissolved.

In order to improve a homogeneous dispersion property and a storage stability of the pigment still more, a blending amount of the dispersing agent is preferably within the range of from 0.1 to 1,000 parts by mass, more preferably within the range of from 1 to 500 parts by mass, further preferably within the range of from 10 to 250 parts by mass with respect to 100 parts by mass of the pigments. When the blending amount is less than 0.1 parts by mass, there may be a case wherein the dispersion stability of the pigment fine particles is not improved.

Subsequently, a method for measuring sizes of particle diameters about the produced pigments fine particles. Volume average particle diameter of the produced pigments fine particles can be measured by means of dynamic light scattering method. Concretely, it can be measured by means of a particle size distribution measuring apparatus (manufactured by HORIBA, Ltd., LB-500) adopting dynamic light scattering method.

Examples

1. Mixing of Two Liquids

Using a flow passage having a multilayered cylindrical structure with two layers, two liquids are allowed to mix each other. An acidic aqueous solution (colorless) of pH-value 8 containing phenolphthalein pH indicator and alkaline aqueous solution of pH-value 12 were used. Flowing an acidic aqueous solution from the center of the nozzle, and flowing an alkaline aqueous solution from outside of the nozzle, a laminated body with the acidic aqueous solution as the first layer and the alkaline aqueous solution as the second layer was formed over the rotational stage. Then, the two liquids were allowed to mix each other in an instant. The flow rate was similarly 5 ml/min both about the acidic aqueous solution and the alkaline aqueous solution respectively. Further, the diameter of the center of the nozzle was 2 mm, and the diameter of the concentric circle was 3 mm. The number of revolutions of the rotational stage was 4,000 rpm. The resultant solution after mixing was recognized by visual observation. Color of mixed solution turned red, and it was recognizable that the liquids were mixed in an instant.

2. Mixing of Three Liquids

Using a flow passage having a multilayered cylindrical structure with three layers, three liquids are allowed to mix each other. Quinacridon PR122 pigment solution with a concentration of 4% by mass containing low molecular compound surfactant (the third layer in a laminated body) was flowed out from the center of the flow passage, DMSO (the second layer) being a good solvent with respect to the pigment was flowed out from the circumference, and water being a poor solvent (the first layer) was flowed out as the outermost layer. The number of revolutions of the rotational stage was 4,000 rpm. Mixing was carried out with flow rates of 10 ml/min about the pigments solution, 30 ml/min about DMSO and 5 ml/min about water respectively. As a result, extremely favorite particles having volume average particle diameter Mv of 20.6 nm, and Mv (volume average particle diameter)/Mn (number average particle size) exhibiting a monodispersing degree of 1.33 were obtained.

Further, by making the pigment solution as the uppermost layer of the multilayer structure on the rotational stage being a solid wall, and by making DMSO being a good solvent as an intermediate layer exactly as mentioned above, the pigment solution and the poor solvent are allowed to contact each other in the vicinity of the nozzle thereby enabling to prevent the particles from precipitating.

What is claimed is:

1. A method for mixing liquids comprising:
    a laminated body formation process for forming a laminated body by laminating a plurality of liquids after discharging the plurality of liquids from a central portion of a rotational stage onto the rotational stage;
    a layer thinning process for allowing the laminated body to form a thin layer by spreading the laminated body from the central portion to an outer peripheral portion side with a centrifugal force induced by a rotation of the rotational stage; and
    a mixing process for allowing the laminated body which was allowed to form a thin layer to mix each other by diffusing it between the layers.

2. The method for mixing liquids according to claim 1, wherein the layer thinning process is controlled by controlling a rotation rate of the rotational stage.

3. A liquid mixing apparatus comprising:
    a rotational stage; and
    a flow passage through which at least two kinds of liquid pass in a vertical direction upwardly, wherein
    the flow passage is disposed perpendicularly with respect the rotational stage,
    an outlet of the flow passage is disposed at the center of the rotational stage, and
    the flow passage has a concentric multilayered cylindrical structure, wherein
    the inner diameter of the outermost layer in the flow passage is not smaller than 3 mm, and the inner diameter of the innermost layer in the flow passage is not smaller than 1 mm.

4. The liquid mixing apparatus according to claim 3, wherein the flow passage has a laminar multilayered cylindrical structure of two layers or not less than three layers.

5. The liquid mixing apparatus according to claim 3, wherein
    the number of revolutions of the rotational stage is not less than 500 rpm but not more than 6,000 rpm.

6. The liquid mixing apparatus according to claim 4, wherein
    the number of revolutions of the rotational stage is not less than 500 rpm but not more than 6,000 rpm.

7. The liquid mixing apparatus according to claim 3, wherein
    a contact angle between a liquid passing through the external layer of the flow passage and the rotational stage is not wider than 90 degrees.

8. The liquid mixing apparatus according to claim 6, wherein
    a contact angle between a liquid passing through the external layer of the flow passage and the rotational stage is not wider than 90 degrees.

9. The liquid mixing apparatus according to claim 3, wherein fine particles are formed by allowing the liquids to mix and react each other.

10. The liquid mixing apparatus according to claim 8, wherein fine particles are formed by allowing the liquids to mix and react each other.

* * * * *